Oct. 28, 1969     M. E. HÉBERT     3,474,751
AMPHIBIOUS SNOW VEHICLE

Filed Jan. 3, 1968     9 Sheets-Sheet 1

Inventor
Maurice E. Hébert
By Cushman, Darby & Cushman
Attorneys

Oct. 28, 1969   M. E. HÉBERT   3,474,751
AMPHIBIOUS SNOW VEHICLE

Filed Jan. 3, 1968   9 Sheets-Sheet 2

Inventor
Maurice E. Hébert
By Cushman, Darby & Cushman
Attorneys

Oct. 28, 1969     M. E. HÉBERT     3,474,751

AMPHIBIOUS SNOW VEHICLE

Filed Jan. 3, 1968     9 Sheets-Sheet

FIG. 5

Inventor
Maurice E. Hébert
By Cushman, Darby & Cushman
Attorneys

Oct. 28, 1969　　　M. E. HÉBERT　　　3,474,751
AMPHIBIOUS SNOW VEHICLE
Filed Jan. 3, 1968　　　　　　　　　　　　　9 Sheets-Sheet 7

FIG. 7

Inventor
Maurice E. Hébert
By Cushman, Darby & Cushman
Attorneys

Oct. 28, 1969     M. E. HÉBERT     3,474,751
AMPHIBIOUS SNOW VEHICLE
Filed Jan. 3, 1968     9 Sheets-Sheet 8

3,474,751
					AMPHIBIOUS SNOW VEHICLE
Maurice E. Hébert, Sillery, Quebec, Canada, assignor, by mesne assignments, to Nanuk Inc., a corporation
Filed Jan. 3, 1968, Ser. No. 695,524
Claims priority, application Canada, Nov. 29, 1967, 6,329
Int. Cl. B60f 3/00; B62d 55/00
U.S. Cl. 115—1					9 Claims

ABSTRACT OF THE DISCLOSURE

An amphibious snow vehicle having a buoyant body and a pair of differentially drivable endless tracks disposed paralled to each other and to the fore/aft axis of the vehicle between a traction train and a rear adjustable train. The body of the vehicle is supported off the ground by plurality of truck mechanisms associated with each endless track and the vehicle is steered by inversely varying the speed of the endless tracks.

---

The present invention relates to a motor vehicle and more specifically to a small amphibious snowmobile.

The majority of prior art vehicles of the minature type, such as the two passenger snowmobiles, are propelled by a single endless track and steered by skis provided at the front of the vehicle. A disadvantage of this type of vehicle is that it is difficult to control, this being due to the fact that it is steered by skis and that the snow conditions will affect the control of the skis. For example, if the snow is hard packed and icy, it will be very difficult to steer the vehicle as the skis will merely slide on the surface of the snow. Also, if a sudden sharp turn has to be suddenly executed, this type of vehicle will have a tendency to turn over because of its high centre of gravity. When this type of vehicle is occupied by a few passengers the majority of the additional weight is to the rear of the vehicle and the skis will not have much control on the snow for the reason that the weight is mainly over the endless track. A further disadvantage is that these vehicles are designed for use during the winter season and are restricted for travel over snow although some adaptations have been provided for the use of the vehicle over water but when adapted thus, the vehicle is restricted for use on water.

Of the amphibious type vehicles known, the majority of these have been equipped with auxiliary propelling means for propelling the vehicle through water and have not been suitable for use on deep snow or swampy terrain. Also, some of these vehicles are restricted for travel on terrain which is substantially free of obstacles such as dead logs, rocks, mud, etc. Of the class of amphibious vehicles supported on two tracks, the majority of these are large vehicles used for transporting heavy equipment and a large number of people. Because of their large size and of their heavy load these vehicles cannot operate in a heavily bushed terrain and thick snow.

It is a feature of the present invention to provide a snowmobile which will operate on land and on water.

Another feature of the present invention is to provide a snowmobile which is highly manoeuverable especially on land.

A still further feature of the present invention is to provide a snowmobile which is constructed for added safety to the passengers and which has a low centre of gravity.

An embodiment of the present invention will now be described with reference to the accompanying drawings in which.

Figure 1:
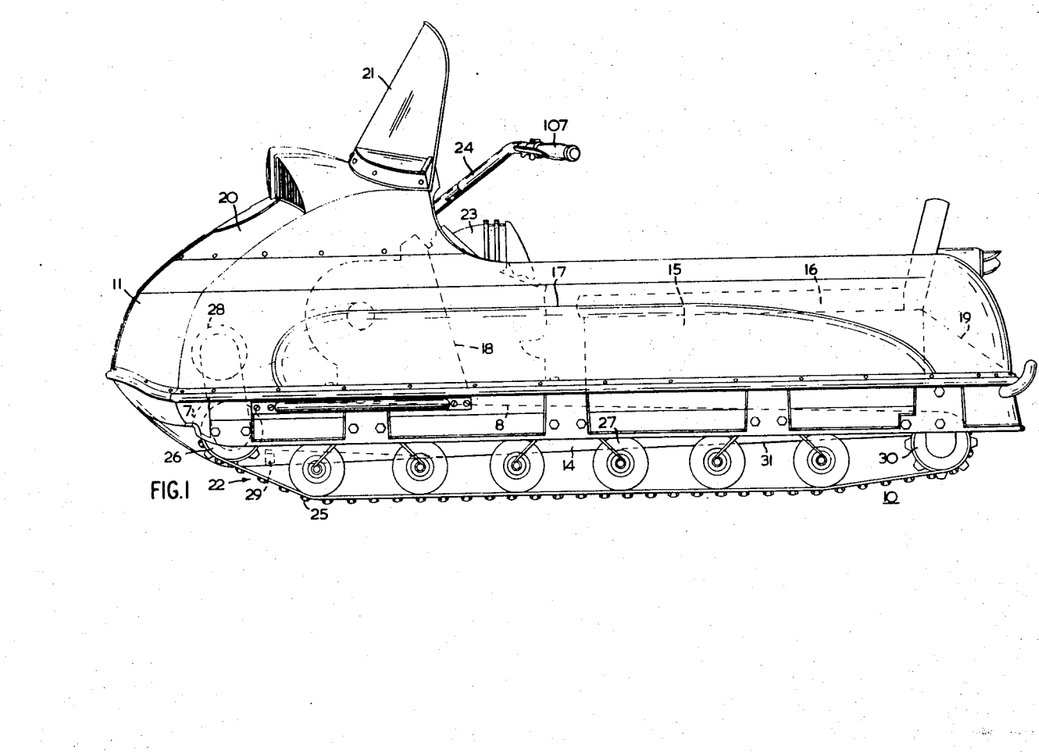
FIGURE 1 is a side view of the amphibious snow vehicle of the present invention.
Figure 2:
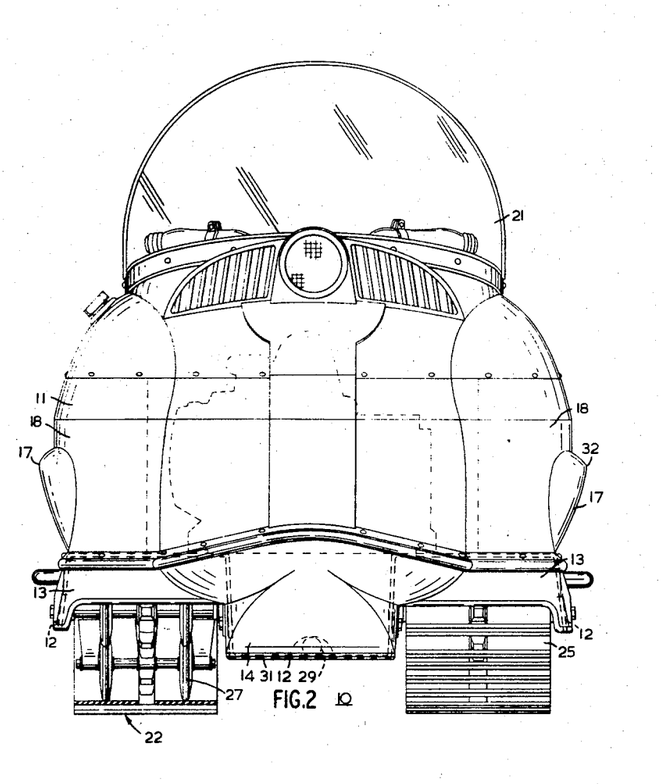
FIGURE 2 is a front view of the snow vehicle as shown in FIGURE 1.

Referring to the drawings and more specifically to FIGURES 1 and 2 there is shown an amphibious snow vehicle generally indicated at 10. The vehicle consists of a body 11 secured to a frame 12, the body and frame preferably but not exclusively constructed of glass fibre material. The cross-section of the frame 12 is illustrated by the heavy dotted lines in FIGURE 2. The frame 12 defines two longitudinal cavities 13 of substantially rectangular cross-section and which extend parallel to the longitudinal axis of the body of the vehicle and on both sides thereof. A track assembly 22 is supported in each cavity and protrudes therefrom to support the vehicle off the ground. Between the cavities 13, the frame 12 defines a central portion 14 of substantially rectangular cross-section which protrudes below the cavities at the front of the vehicle and tapers off to the rear of the vehicle to a point which is in the same plane as the opening of the cavities (see FIG. 1). The forward part of the central portion 14 is curved upwardly such that the surface 31 of the central portion resembles the configuration of a ski. The central portion being thus shaped adds to the support of the vehicle when travelling over deep soft snow. The interior of the central portion 14 contains a gas tank and a storage compartment 15 located under a passenger's seat 16. On each side of the body 11 there is formed integral therewith an elongated embossed section 17, extending longitudinally to the body 11 and defining a bulbous portion 32 in the upper part thereof to further add to the buoyancy and stability of the vehicle when operating in water. Should the vehicle capsize, floats 18 and 19 are secured in the body 11 on both sides in the front and rear thereof to ensure that it will remain afloat. In the front portion of the vehicle there is provided an engine 23 and a differential assembly 28. A hood 20 is detachably secured to the front of the body 11 for access to the engine and differential assembly. A windshield 21, also detachably secured, is provided on the hood 20.

To propel the vehicle 10, a track assembly, generally indicated at 22 comprising an endless track 25 having a plurality of laterally spaced lugs 9 is provided in each cavity 13. The upper part 8 of the track assembly 22 is sloped upwardly towards the front of the vehicle such that its endless track will travel deeper in the front of the cavity 13 for reasons which will be described later. The front of each cavity 13 is surved, as shown by numeral 7, such that if a counter thrust is developed, in the upper part of the track assembly 22, when the vehicle is used on water, this thrust will be thrown downwardly and the vehicle will still have a slight forward thrust. The track assemblies 22 are driven by an engine 23 located at the front of the vehicle. To add to the track propulsion when the vehicle is used on water, an exhaust port 29 is located in the surface 31 of the central portion 14 of the vehicle so that the escaping gases will provide a certain degree of jet propulsion. The air from the engine cooling system is also channeled to the exhaust port.

Figure 3:
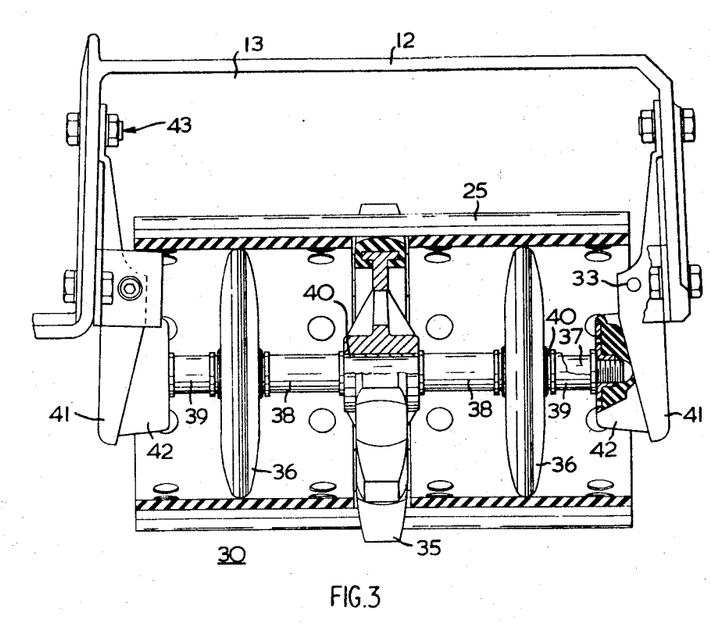
FIGURE 3 is a front view partly in section of the rear train assembly forming part of the track assembly.
Figure 4:
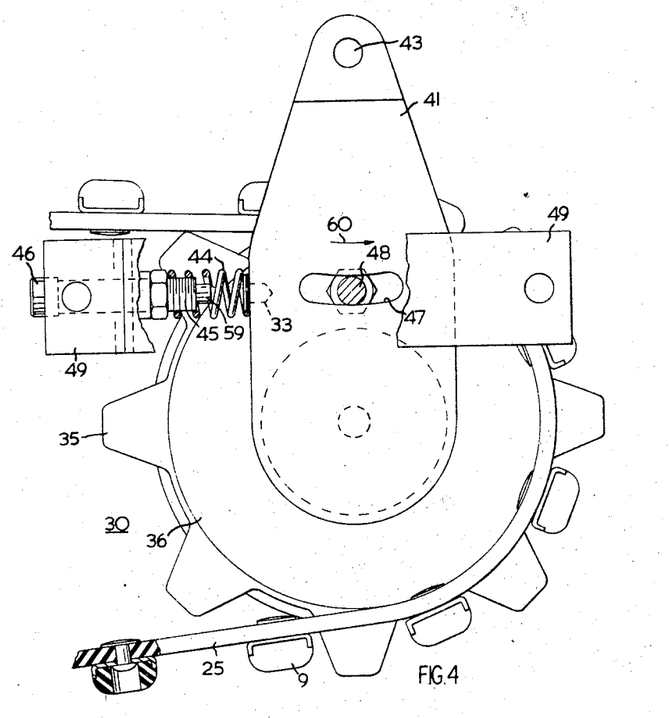
FIGURE 4 is a side view partly in section of a portion of FIGURE 3.

Referring now to FIGURES 3 and 4 there is shown the rear train assembly, generally indicated at 30, forming part of the track assembly 22. The rear train assembly comprises an idle sprocket wheel 35 having a track supporting wheel 36 on both sides thereof and secured to a common axle 37 supported in the cavities 13 and disposed transversely to the longitudinal axis of the vehicle. The track supporting wheels 36 are held a fixed distance relative to the idle sprocket wheel 35 by an inner spacer 38 and an outer spacer 39, respectively. Both the track supporting wheels 36 and the idle sprocket wheel 35 are mounted on bearings 40. The axle 37 is supported between a pair of arms 41, each of which are provided with a rubber boss 42 in which the respective ends of the axle is journalled. The upper portion of the arms 41 are pivotally secured, at 43, to the frame 12 of the vehicle. The rear train holds the endless track 25 under proper tension by the provision of an adjustable bolt 45 which adjusts the position of the arms 41. The bolt 45 is threadably secured to a saddle 49 which is rigidly attached to the frame. The end portion 59 of the adjustable bolt 45 is of reduced diameter and is received in a port 33 provided on the side surface of the arm 41, as shown in FIG. 3. To adjust the tension in the endless track 25, the bolt 45 is threaded by means of a knob 46. With this arrangement the arm 41 is adjustable in the direction of arrow 60. The amount of displacement of the arm 41 is limited by the provision of an arcuate slot 47 therein which cooperates with a bolt 48 protruding therethrough and secured to the saddle 49. To keep a permanent tension on the arm 41 and consequently the endless track 25, a compression spring 44 is provided about the adjustable bolt 45 and also acts against the arm 41 in the direction of arrow 60.

Figure 5:
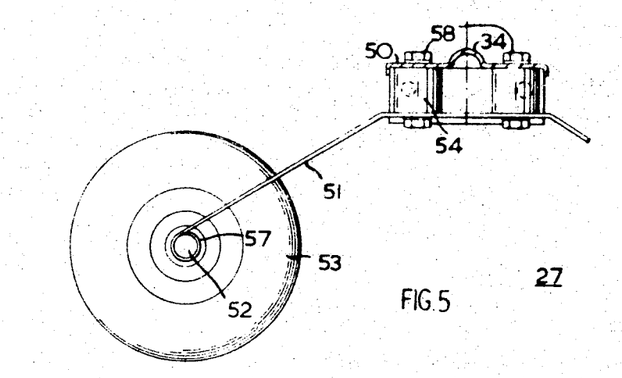
FIGURE 5 is a side view of a portion of a truck assembly.
Figure 6:
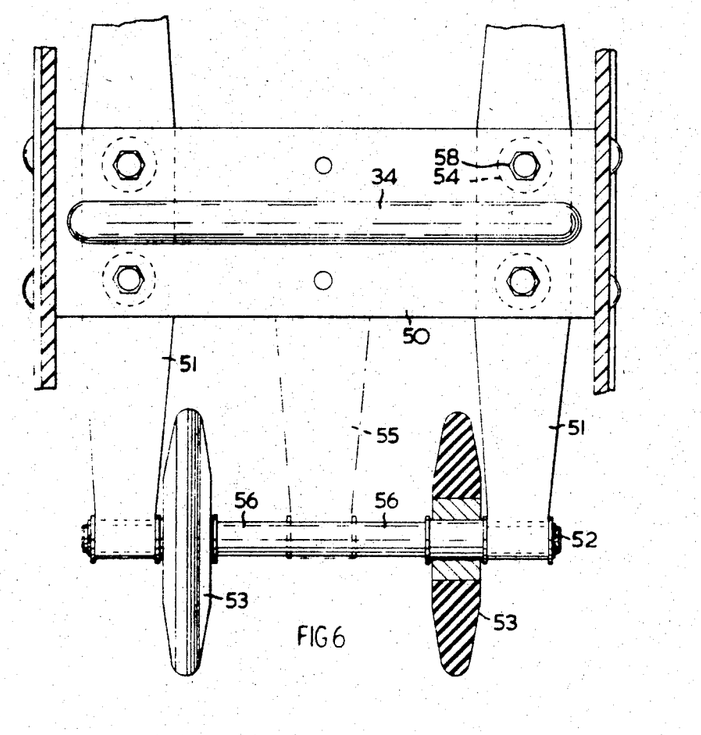
FIGURE 6 is a plan view partly in section of a portion of a truck assembly.

To support the vehicle off the ground, a plurality of truck mechanisms 27, as shown in FIGURES 5 and 6, are spaced along the longitudinal axis of the track assembly. The truck mechanisms 27 consists of a supporting bracket 50 for securing to the vehicle and for supporting two springs 51. The supporting bracket 50 defines an embossed section 34, extending along its longitudinal axis and at the center thereof to support the endless track 25 in the upper part of the track assembly. A third spring 55, shown in phantom lines may be adapted to the front truck assembly for overload. The springs 51 each include a loop 57 at its end to support an axle 52 on which wheels 53 are secured. The springs 51 and the bracket 50 are separated by rubber shock absorbers 54. The shock absorbers 54 are of substantially cylindrical configuration and are positioned about the retaining bolts 58 to absorb the displacement of the springs 51 about the bolts 58 when the springs are flexed. A pair of wheels 53 are mounted on each axle 52 and are separated from one another by spacers 56. Although FIGURES 5 and 6 only show a portion of the assembly, the other end of the spring 51 also supports an axle containing wheels.

Figure 7:
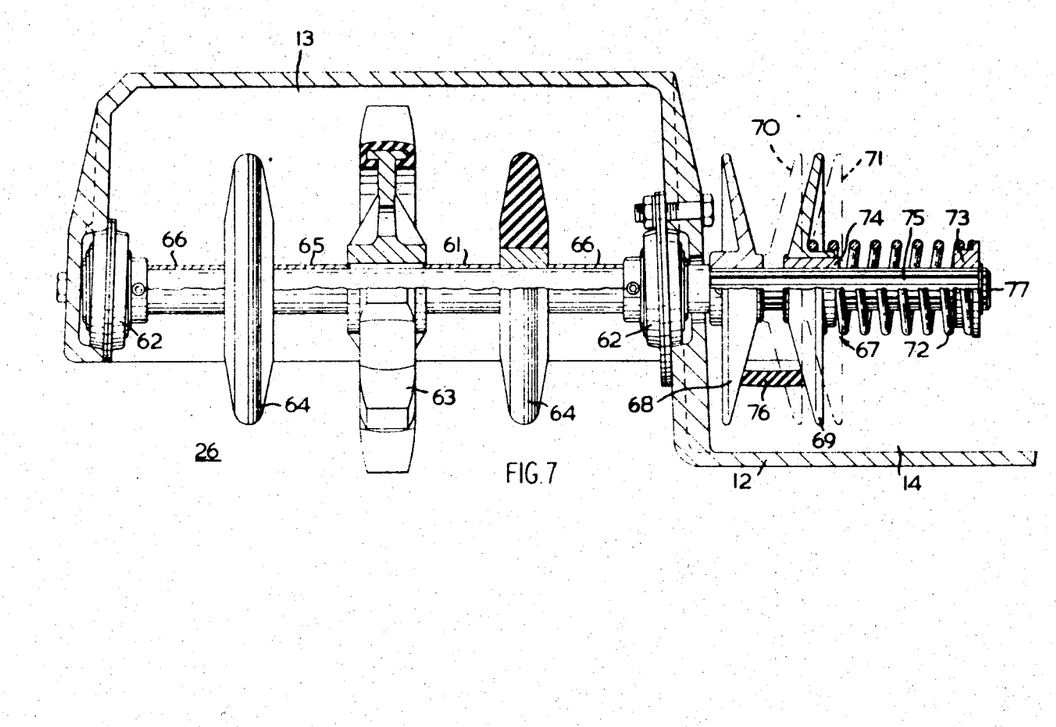
FIGURE 7 is a front view, partly in section of the traction train assembly.

Referring now to FIGURE 7 there is shown the traction train assembly 26 for driving the endless tracks 25 (FIGURES 1 and 2). Although FIGURE 7 only shows one assembly, identical assemblies are provided on both sides of the vehicle. The traction train assembly, generally indicated at 26, comprises a shaft 61 supported in the front portion of the cavity 13 and transversely to the longitudinal axis of the vehicle, and extending a limited distance inside the central portion 14 of the frame 12. The shaft 61 is supported by bearings 62 which provides limited axial displacement of the shaft 61. The bearings 62 also prevent leakage between the cavity 13 and the central portion 14 when the vehicle is used on water. To drive the endless track a sprocket wheel 63 is rigidly secured to the shaft 61 and located at the centre of the width of the cavity 13. To support the track laterally, a track supporting wheel 64 is positioned on each side of the sprocket wheel 63 and spaced equidistant from the sprocket wheel 63 by an inner and outer spacer member 65 and 66 respectively, on the shaft 61.

The portion of the shaft 61 which extends in the central portion 14 of the frame 12, is provided with a variable diameter pulley 67 having a fixed plate 68 and a movable plate 69. The movable plate 69 is displaceable from a closed position, as illustrated in phantom lines at 70, to a fully opened position, as illustrated in phantom lines at 71. The movable plate 69 is spring biased against the fixed plate by a compression spring 72 being positioned between the movable plate and a retaining member 73 secured at the end 77 of the shaft 61. The movable plate 69 is fitted with a bearing 74 having a female splined centre to cooperate with a plurality of parallel splines 75 provided on the surface of the portion of the shaft 61 which extends into the central portion of the frame. The maximum differential ratio of the variable diameter pulley 67 is 2½:1.

Figure 8:
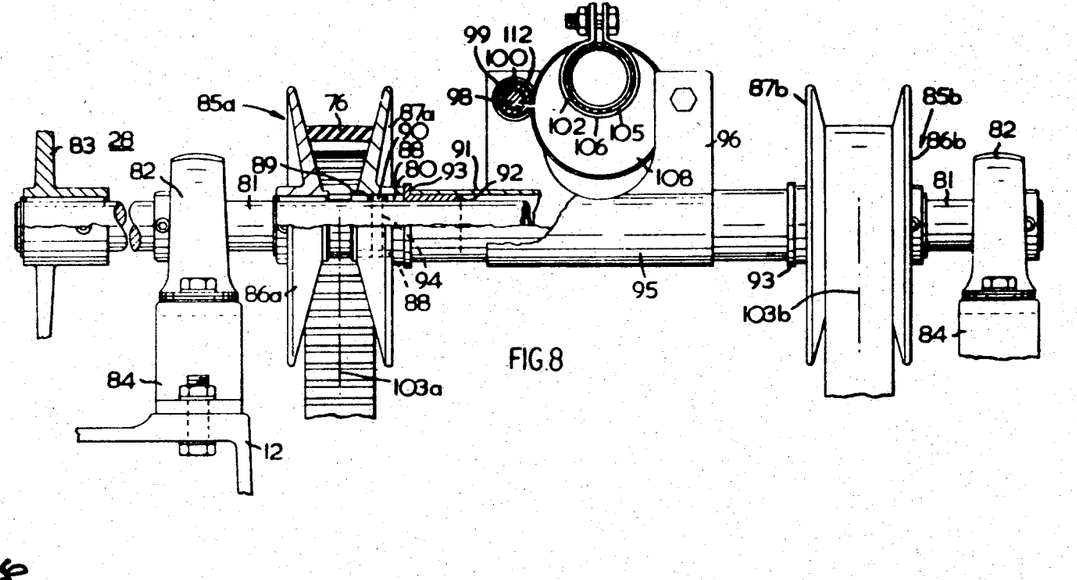
FIGURE 8 is a front view partly in section of the differential assembly and steering assembly.
Figure 9:
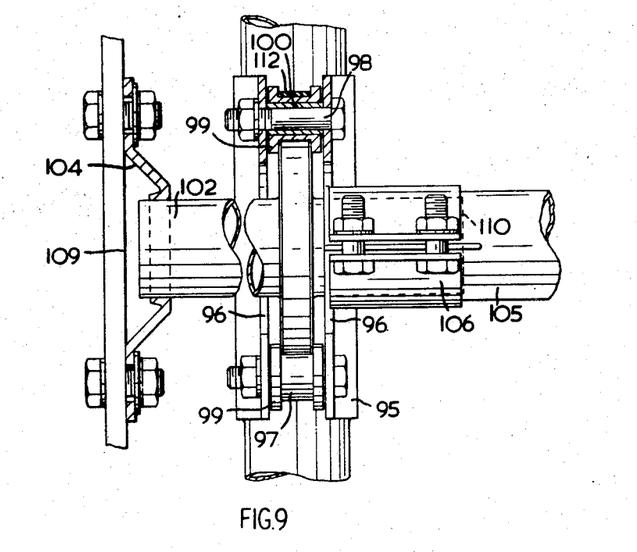
FIGURE 9 is a plan view of a portion of FIGURE 8 showing the steering assembly.
Figure 10:
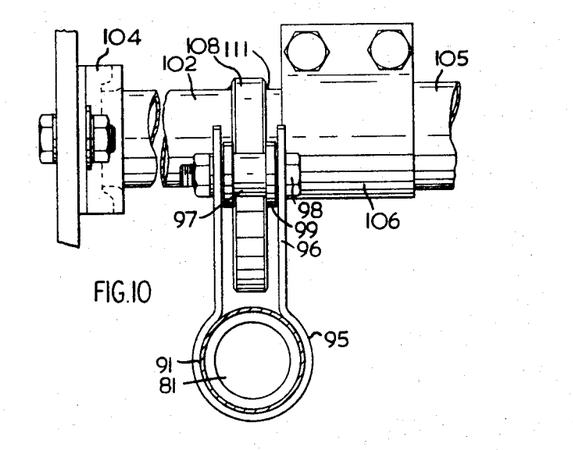
FIGURE 10 is a side view of FIGURE 9.

To control the speed of the endless tracks individually, to thereby steer the vehicle, there is provided a differential assembly generally indicated at 28, FIGURES 8, 9 and 10. The differential assembly 28 is controlled by the steering assembly 24 (FIG. 1). As shown in FIGURE 8 the differential assembly 28 comprises a driven shaft 81 supported between two bearings 82 associated with a respective support member 84 affixed to the frame 12 of the vehicle, a sprocket wheel 83 is secured at one end of the driven shaft 81 and is coupled to the engine drive shaft (not shown). Intermediate the support members 84, a pair of variable diameter pulleys 85a and 85b are mounted on the driven shaft 81. The pulleys 85a and 85b each have a fixed plate 86a and 86b respectively, which plates are equidistantly spaced from the support members 84 and secured to the driven shaft 81. The variable diameter pulleys 85a and 85b also contain a movable plate 87a and 87b respectively. The movable plates 87a and 87b are provided with channels 88 in its centre 89. The channels 88 cooperate with a respective end of a key pin 90 extending through a hole 94 in the driven shaft 81 to thereby fix the movable plates relative to the driven shaft 81. With this arrangement, the movable plates 87a and 87b can be displaced along the longitudinal axis of the driven shaft 81. To displace the movable plates 87a and 87b in order to change the differential ratio of the variable diameter pulleys 85a and 85b, a sleeve 91 is positioned about the driven shaft 81 between the movable plates 87a and 87b of the pulleys 85a and 85b. The sleeve 91 is supported at both ends on a respective thrust bearing 92 associated with a respective one of the movable plates 87a and 87b. The thrust bearings 92 have an upstanding portion 93 one face of which cooperates with a respective end of the sleeve 91 and the other face abutting against the face of a protruding central ring portion 80 of each movable plate 87a and 87b.

To displace the sleeve 91 and consequently the movable plates 87a and 87b in order to change the differential ratio of the variable diameter pulleys 85a and 85b, inversely one with the other, a bracket 95 is centrally located and welded to the sleeve 91. The bracket 95 is of substantially U-shaped cross-section and comprises two parallel sides 96, in the form of a rectangular plate, and extending above the sleeve 91 on both sides thereof. In the upper portion and between the sides 96 there is provided a pair of rollers 97 each being located in a respective corner of the sides 96. Each roller 97 is formed with guides 99 on the ends thereof and is supported on a bearing 100 fitted over the bolt 98. A rubber sleeve 112 is provided on each roller 97, between the guides 99, to assure adequate contact with a cooperating cam 108 described later. The parallel sides 96 each have a U-shaped opening 101 centrally located in the surface thereof and aligned one with the other to permit passage of a steering column extension 102 therebetween. The steering column extension 102 is perpendicular to the longitudinal axis of the driven shaft 81 and is positioned equidistantly from the central axis 103a and 103b of the variable diameter pulleys 85a and 85b respectively. The steering column extension 102 is supported at its lower end 109 in a bracket 104 secured to the body of the vehicle. The other end 110 of the steering column extension 102 is positioned within a steering column 105 and secured therein by an adjusting collar 106 fitted around the steering column. The steering column 105 is coupled to the steering arms 107 (FIG. 1) of the vehicle such that the displacement of the steering arms 107 will cause the steering column 102 to rotate about its axis in a direction depending upon the direction of displacement of the steering arms 107. In order to cause the sleeve 91 on the shaft 81 to be displaced relative to the displacement of the steering arms 107, a cam 108 is rigidly secured to the steering column extension 102 at 111 by a spot weld or any similar rigid connection. The diameter and width of the cam 108 is selected such that its outer periphery will engage with the rubber sleeve 112 on the surface of both rollers 97 between the guides 99. Thus, with this arrangement it can be seen that when the steering column 105 rotates on its axis, the cam 108 is displaced and applies a force against one of the rollers 97 which causes the parallel sides 96 of the bracket 95 to be shifted to either the right or left depending on the direction of the steering column thereby changing the differential ratio of the variable diameter pulleys 85a and 85b inversely one with respect to the other.

In operation the vehicle is steered by displacing the movable plates of the variable diameter pulleys 85a and 85b which in turn displace the movable plates of an associated variable diameter pulley provided on an associated shaft located in the cavities on each side of the vehicle. By displacing the variable diameter pulleys 85a and 85b the speed ratio of the engine to the individual shafts 61 is controlled and consequently the speed of the endless tracks is varied. For example, if the steering arms 107 are displaced to execute a turn, the sleeve 91 positioned between both variable diameter pulleys 85a and 85b is displaced along the longitudinal axis of the driven shaft 81 which in turn displaces the movable plates 87a and 87b inversely one with the other relative to their associated fixed plate. Supposing movable plate 87a is displaced in a direction towards its associated fixed plate 86a, then the belt 76 associated therewith moves up between the plates 87a and 86a. Since the effective diameter of variable diameter pulley 85a has been increased, the tension in the belt 76 has also increased thereby causing the plates of the associated pulley 67 on the shaft 61 to separate against the action of the compression spring 72 (see FIG. 7) and thus reducing the effective diameter pulley 67. Because the effective diameter of variable diameter pulley 85a has increased and the diameter of pulley 67 has decreased, the belt 76 associated therewith is turning much faster since it describes a greater arc about the driven shaft 81. This change in speed in the belt 76 coupled with the change in diameter of pulley 67 causes shaft 61 to be driven at an increased speed, thus speeding up the drive of its associated endless track 25. Whilst the speed of the endless track associated with the variable diameter pulley 85a has increased, the speed of the endless track associated with variable diameter pulley 85b has decreased. The decrease of this endless track is due to the fact that the plates 87b and 86b of pulley 85b have separated thus reducing its effective diameter and increasing the effective diameter of its associated pulley 67, this being due to the decrease of tension in its associated belt and the action of the compression spring moving the variable plate towards the fixed plate of pulley 67 of the associated traction train assembly 26. Because of the increase in speed in one track and the decrease in the other, the vehicle will effect a turn. The sharpness of the arc of the turn will obviously depend on the differential ratio of the variable diameter pulleys and also the speed of the engine.

Of course, to maintain the vehicle in a substantially straight line the steering arms are held in a position whereby the variable diameter pulleys 85a and 85b are of approximately identical ratios. It will be appreciated that because of the steering mechanism used, the vehicle may execute very sharp turns, as described above, and is highly manoeuverable on various kinds of surface. Also, it will be appreciated that by providing a steering mechanism as described above the control of the vehicle is very sensitive and does not require much strength to displace it, thus providing a form of power steering.

The operation of the snowmobile on a body of water is very much the same as on land, the propelling motion being provided by the endless tracks and the steering being effected in the same manner. However, the speed of the vehicle will be considerably reduced when operated in a body of water as the tracks are turning in a liquid mass. In order to utilize all possible means of propulsion from the vehicle, the exhaust port 29 is located under the central portion 14 of the vehicle and also provides a certain degree of jet propulsion. The exhaust port also performs another important function that being, to assure that a certain volume of air is present in the cavities 13 when the vehicle is operating on water. Some of the air and gases from the exhaust port will escape sideways and will be trapped by the cavities thus maintaining a certain volume of air therein.

To ensure propulsion of the vehicle through water the endless tracks are secured in cavities, as described hereinabove. The purpose of the cavities is to trap air therein when the vehicle enters a body of water which air is essential to the propulsion of the vehicle and at the same time provides additional buoyancy. The reason for trapping air in these cavities is to eliminate a portion of the counter thrust that would otherwise exist of the upper part of the endless track assembly was travelling totally in water. Also, as shown in FIG. 1 the upper part of the track assembly is slopped upwardly to the front of the cavity to ensure that there will always exist a forward thrust of the vehicle regardless if the air is highly compressed in the cavities or concentrated at front of the cavities due to overloading in the rear of the vehicle. The forward part of the central portion 14 is also shaped to substantially reduce the friction of the vehicle when operating in water, and to provide lift.

I claim:

1. An amphibious snow vehicle having a buoyant body supported on a pair of drivable endless tracks disposed parallel to each other and to the fore/aft axis of said vehicle, said endless track assemblies each having a traction train, a rear train, an endless track supported between said traction train and said rear train and a plurality of truck mechanisms positioned between said traction train and rear train, said rear train having a pair of pivoted arms, an axle carried by said pair of arms and having a sprocket wheel and a track supporting wheel on each side of said sprocket wheel for supporting said endless track, and adjusting means for adjusting the tension of said endless track.

2. An amphibious snow vehicle as claimed in claim 1 wherein said adjusting means is associated with said pivoted arms, each of said pivoted arms being partially rotatable about its pivot point by said adjusting means.

3. An amphibious snow vehicle as claimed in claim 1 further including a compression spring to keep said endless track tensioned.

4. An amphibious snow vehicle having a buoyant body supported on a pair of drivable endless tracks disposed parallel to each other and to the fore/aft axis of said vehicle, said endless track assemblies each having a traction train, a rear train, an endless track supported between said traction train and said rear train and a plurality of truck mechanisms positioned between said traction train, said truck mechanisms each having a substantially elongated rectangular support bracket secured to said vehicle and extending transversely to the longitudinal axis of said vehicle, said support bracket having a track supporting surface thereon for supporting said endless track in the upper portion of said endless track assembly.

5. An amphibious snow vehicle as claimed in claim 4 further comprising a spring supported by said supporting bracket and shock absorbing means between said spring and said supporting bracket, said spring extending angularly and downwardly from both sides of said supporting bracket for supporting wheels at its ends.

6. A vehicle steering mechanism comprising a driven shaft having a pair of variable diameter pulleys fixed thereto and connected via a V-belt to a respective vehicle driving member, each said pulleys having a first plate fixedly secured to said shaft and a second plate slidably secured for limited movement along the longitudinal axis of said shaft, a displaceable member cooperating with both said second plates, and a steering column having a cam secured thereto, said cam being in frictional engagement on opposite sides of its periphery with a bracket secured to said displaceable member so that when said steering column is displaced about its longitudinal axis said cam causes said bracket and displaceable member to shift thereby changing the effective diameter of said variable diameter pulleys inversely one with respect to the other to thereby change the speed of said vehicle driving members inversely.

7. A vehicle steering mechanism as claimed in claim 6 wherein said displaceable member is an elongated sleeve positioned about said drive shaft and cooperating at each of its ends with a respective one of said second plates.

8. A vehicle steering mechanism as claimed in claim 7 wherein said bracket includes two substantially parallel sides extending along the longitudinal axis of said elongated sleeve, and a pair of rollers secured between said sides and positioned on opposite sides of the periphery of said cam and in frictional engagement therewith.

9. An amphibious snow vehicle comprising a buoyant body supported on a pair of drivable endless tracks, a driven shaft supported in said buoyant body and having a pair of variable diameter pulleys fixed thereto and connected via a V-belt to a respective endless track, each said pulleys having a first plate fixedly secured to said shaft and a second plate slidably secured for limited movement along the longitudinal axis of said shaft, a displaceable member cooperating with both said second plates, and a steering column having a cam secured thereto, said cam being in frictional engagement on opposite sides of its periphery with a bracket secured to said displaceable member so that when said steering column is displaced about its longitudinal axis said cam causes said bracket and displaceable member to shift thereby changing the effective diameter of said variable diameter pulleys inversely one with respect to the other to thereby change the speed of said endless tracks inversely.

References Cited
UNITED STATES PATENTS

| | | | |
|---|---|---|---|
| 3,404,745 | 10/1968 | Smieja | 305—35 XR |
| 2,404,492 | 7/1946 | Hait | 115—1 |
| 2,656,904 | 10/1953 | Grenier. | |
| 2,923,268 | 2/1960 | Fletcher et al. | 115—1 |
| 3,023,824 | 3/1962 | Bombardier | 180—5 XR |
| 3,213,821 | 10/1965 | Godwin | 115—1 |
| 3,263,763 | 8/1966 | Adams | 180—6.2 |
| 3,269,218 | 8/1966 | Fisher. | |
| 3,308,783 | 3/1967 | Gay et al. | 115—1 |
| 3,309,150 | 3/1967 | Marier | 180—5 |
| 3,362,492 | 1/1968 | Hansen | 180—5 |

ANDREW H. FARRELL, Primary Examiner

U.S. Cl. X.R.

180—5